United States Patent [19]

Anglin

[11] 4,245,176
[45] Jan. 13, 1981

[54] VOLTAGE MULTIPLIER DEVICE

[76] Inventor: Russell E. Anglin, 6157 Cottle Rd., San Jose, Calif. 95123

[21] Appl. No.: 936,372

[22] Filed: Aug. 24, 1978

Related U.S. Application Data

[63] Continuation-in-part of Ser. No. 858,666, Dec. 8, 1977, abandoned.

[51] Int. Cl.³ .............................................. H01J 19/82
[52] U.S. Cl. .................................... 315/101; 315/105; 315/207; 316/2; 328/270
[58] Field of Search ............. 315/1, 94, 101, 105–107, 315/200 R, 227 R, 246, 291, 95, 97, 205, 207; 316/2, 28; 328/270, 268, 262; 363/59–61; 307/109, 146; 358/190

[56] References Cited

U.S. PATENT DOCUMENTS

| | | | |
|---|---|---|---|
| 2,280,330 | 4/1942 | White | 315/207 X |
| 2,466,250 | 4/1949 | Marshall | 315/101 X |
| 2,757,316 | 7/1956 | Ackerman | 315/106 |
| 2,985,812 | 5/1961 | Peterson | 363/61 |

OTHER PUBLICATIONS

Eisenberg, *Cathode-Ray Tube Rejuvemators, Radio & Television News,* Oct., 1952, pp. 62–63.

*Primary Examiner*—Eugene R. LaRoche
*Attorney, Agent, or Firm*—Paul L. Hickman

[57] ABSTRACT

A voltage multiplier device is disclosed which includes a circuit and a means for coupling the circuit between a television filament transformer and the heater filament leads of a C.R.T. picture tube of a television set. The device is operative to develop a voltage across the two leads of the C.R.T. heater filament that is greater than the voltage developed across the two secondary leads of the transformer.

11 Claims, 7 Drawing Figures

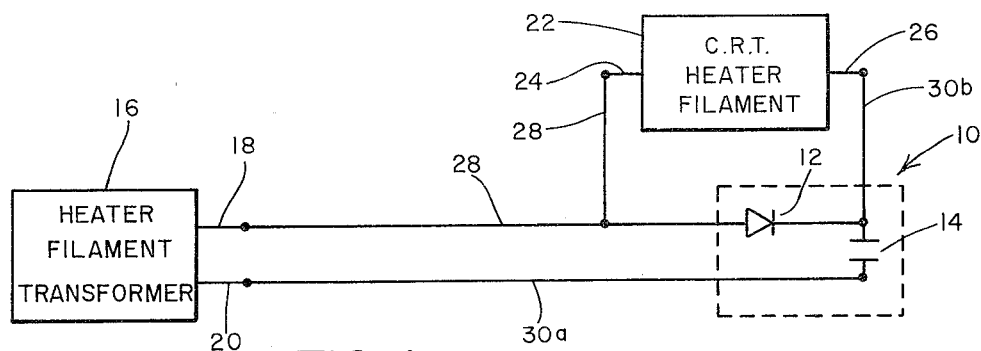
FIG 1
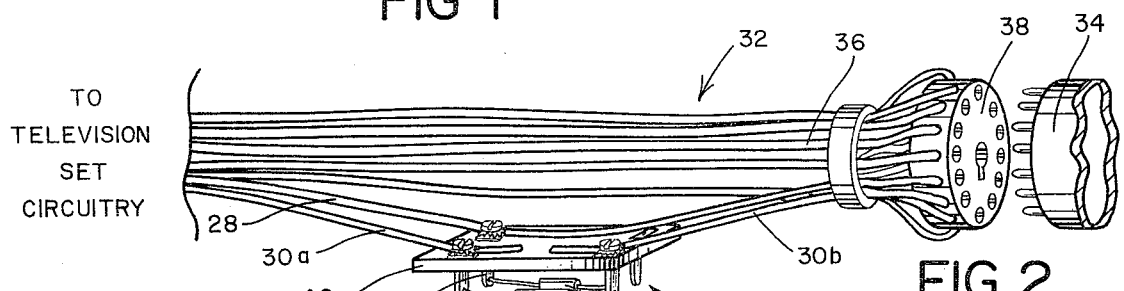
FIG 2
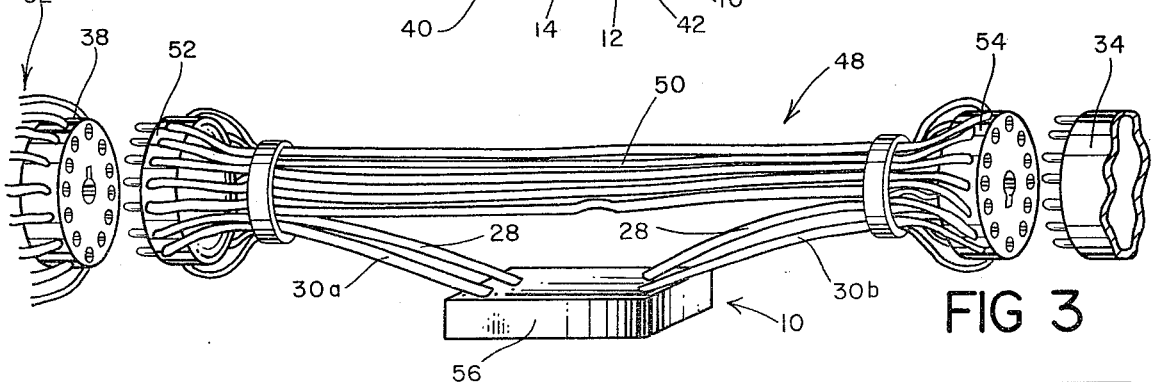
FIG 3
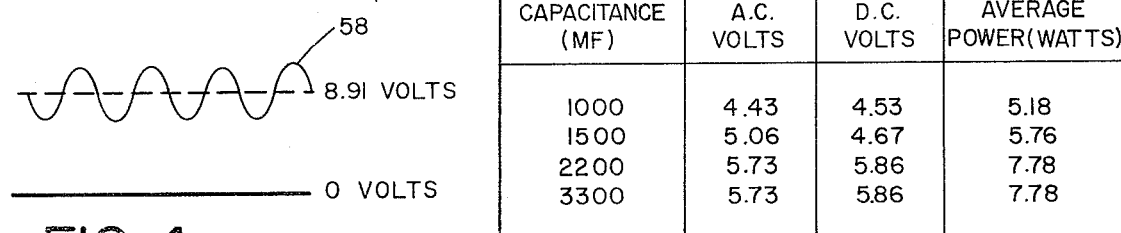
FIG 4
| CAPACITANCE (MF) | A.C. VOLTS | D.C. VOLTS | AVERAGE POWER (WATTS) |
|---|---|---|---|
| 1000 | 4.43 | 4.53 | 5.18 |
| 1500 | 5.06 | 4.67 | 5.76 |
| 2200 | 5.73 | 5.86 | 7.78 |
| 3300 | 5.73 | 5.86 | 7.78 |
FIG 5
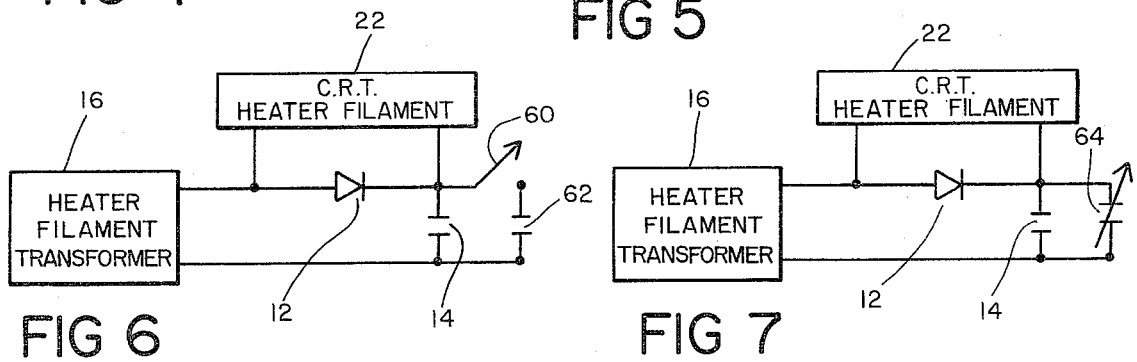
FIG 6
FIG 7

VOLTAGE MULTIPLIER DEVICE

CROSS REFERENCES TO RELATED APPLICATIONS

This patent application is a continuation-in-part of a copending patent application entitled "POWER BOOSTER APPARATUS", filed Dec. 8, 1977 and assigned Ser. No. 858,666, abandoned.

BACKGROUND OF THE INVENTION

1. Field of the Invention

This invention relates generally to voltage multipliers, and more particularly to voltage multipliers adapted to increase the voltage developed across the leads of a C.R.T.'s heater filament to increase the electron emission of the C.R.T.'s cathode.

2. Discussion of the Prior Art

The cathodes of a cathode ray tube (C.R.T.) tend to degrade in electron emission capabilities with time and usage. This will result in gradually decreasing picture tube brightness and clarity until, finally, the C.R.T. must be replaced.

An aging C.R.T. may be rejuvinated by applying an increased voltage to the leads of the heater filament so as to increase the electron emission of the cathodes. In the prior art, this increased voltage was typically supplied to the heater filament leads by a transformer having a higher secondary voltage than that supplied by the original heater filament transformer.

For instance, in U.S. Pat. No. 2,757,316, N. A. Ackerman discloses an apparatus for brightening picture tubes that includes a multitap transformer having a primary connected to a 120 volt A.C. power source and having a plurality of secondaries so that different heater filament voltages can be selected depending upon the condition of the C.R.T. and upon the picture brightness desired by the user. A problem with using an add-on transformer such as disclosed by Ackerman is that the new, higher voltage suddenly supplied by the transformer has a tendency to "burn out" a cold C.R.T. heater filament.

Another problem with using transformers to provide for an increased heater filament voltage is that they are costly and are generally bulky in size.

SUMMARY OF THE INVENTION

It is an object of this invention to provide a low cost, dependable and effective voltage multiplier device for developing an increased voltage across the two leads of a C.R.T. heater filament.

It is a further object of this invention to provide a voltage multiplier device wich develops a gradually increasing voltage between the filament leads of a C.R.T. so as to minimize the danger of heater filament burn-out.

These objects have been met by a voltage multiplier device which includes, briefly, a rectifier coupling a first secondary lead of a filament transformer and one of the C.R.T.'s filament leads to another one of the filament leads and to one lead of a capacitor having its second lead coupled to a second secondary lead of the filament transformer. Also disclosed are several novel methods for attaching the electronic components of the voltage multiplier device to a C.R.T. wire harness.

It is a material advantage of this invention that the components of the device are compact, light weight and inexpensive in comparison to the transformer that is found in prior art voltage multiplier devices.

Another advantage of this invention is that the new, higher heater filament voltage is slowly developed across the C.R.T. filament because of the charging of the capacitor, so that the possibility of C.R.T. heater filament burnout is minimized.

These and other objects and advantages of the present invention will no doubt become apparent to those skilled in the art after they have read the following detailed description as accompanied by the several figures of the drawing.

BRIEF DESCRIPTION OF THE DRAWING

FIG. 1 illustrates a voltage multiplier device in accordance with the present invention connected to a heater filament transformer and the heater filament leads of a C.R.T.;

FIGS. 2 and 3 illustrate two alternate embodiments of the device shown in FIG. 1;

FIG. 4 is a waveform representative of the voltage developed between C.R.T. heater filament lead wires by the device of the present invention;

FIG. 5 is a table listing the A.C. volts and the D.C. volts developed across a pair of C.R.T. heater filament leads by the present device and the average power dissipated by the heater filament for differing values of the capacitor of the device;

FIG. 6 is a schematic representation of an alternate embodiment for the voltage booster device shown in FIG. 1; and FIG. 7 is a schematic representation of a second alternate embodiment for the voltage booster device shown in FIG. 1.

DESCRIPTION OF THE PREFERRED EMBODIMENT(S)

In FIG. 1 a voltage multiplier device 10 in accordance with the present invention is shown to include a rectifier 12 and a capacitor 14. The device is coupled into a C.R.T. heater filament circuit which includes an A.C. heater filament transformer 16 having a pair of secondary leads 18 and 20 and a C.R.T. heater filament 22 having a pair of heater filament leads 24 and 26. Usually secondary lead 18 is coupled to filament lead 24 by a wire, such as wire 28, and secondary lead 20 is coupled to lead 26. To implement the device of this invention, the wire normally coupling secondary lead 20 to filament lead 26 is severed to form a first wire 30a that is coupled to lead 20 and a second wire 30b that is coupled to lead 26.

In this preferred embodiment, the anode of rectifier 12 is coupled to leads 18 and 24 by wire 28, the cathode of the rectifier is coupled to lead 26 and to a first plate of the capacitor by wire 30b and the other plate of the capacitor is coupled to lead 20 by wire 30a. It has been found, however, that the polarity of rectifier 12 is irrelevant to the operation of my device, although the polarity of capacitor 14, if it is polarized, should be in accordance with the polarity of the rectifier.

In FIG. 2, an embodiment of my device is shown attached to a standard wire harness 32 of a television C.R.T. 34. Wire harness 32 includes a bundle of wires 36 attached to the sockets of a female connector 38 which can engage with the pins of C.R.T. 34. In this embodiment, capacitor 14 is coupled between an insulation piercing terminal post 40 and another insulation piercing terminal post 42. Rectifier 12 extends between post 42 and another insulation piercing terminal post 44. The terminal posts, which are mounted upon a support board 46, are preferably of the type known as IPP SEMS screws with piercing washers.

To install the device shown in FIG. 2, the wires carrying the heater filament current, which are usually brown in color and are often twisted together to prevent induction problems, are slightly separated from the other wires 36 of the wire harness and one of the two heater filament wires is cut. This defines wires 28, 30a and 30b as previously described. The wires are placed under the toothed washers of the insulation piercing terminal posts and the screw tops of the terminal posts are screwed down until the toothed washers pierce the insulation of the wires and contact the conductor encased therein. When this is accomplished, the device as previously described is activated and operational.

Another embodiment of this invention is illustrated in FIG. 3. In this embodiment, female connector 38 which, as you will remember, is connected to wire harness 32, is separated from the pins of C.R.T. tube 34. Then the device 10 which, in this case, includes a wire harness 48 having a bundle of wires 50 connected at one end to the pins of a male connector 52 and connected at the other end to the sockets of a female connector 54, and a circuit box 56 which houses the diode and capacitor. Wires 28 and 30a enter circuit box 56 at one end and wires 28 and 30b exit the circuit box at the other end. Within the circuit box, the rectifier and capacitor are coupled to the wires as was discussed with reference to FIG. 1. To actuate the device of this embodiment, connectors 38 and 52 are engaged and connector 54 and the pins of C.R.T. 34 are engaged.

For all of the above discussed embodiments of this invention, rectifier device 12 is preferably a solid state diode of suitable current-carrying capabilities and capacitor 14 is preferably an electrolytic capacitor ranging in value from 1,000 to 3,000 microfarads.

If the rectifier and capacitor are assumed to be ideal components and the heater filament transformer is likewise assumed to be ideal, then the voltage developed between leads 24 and 26 of the C.R.T. heater filament should be approximately 1.414 times the R.M.S. voltage developed between secondary leads 18 and 20 of the transformer. This consequently increases the power dissipated by the heater to cause a greater amount of electron emission by the cathodes.

Referring now to both FIGS. 4 and 5, the presently believed theory of operation of the present device may be more clearly described. Since, for this description, all components are assumed to perform ideally, the performance of a circuit with real components will vary slightly.

The voltage developed between leads 18 and 20 by a typical heater filament transformer is usually about 6.3 R.M.S. volts. On positive half-cycles, capacitor 14 is charged to the peak voltage of the voltage developed between secondary leads 18 and 20 or approximately 8.91 volts as indicated by the broken line in FIG. 4. Thus, an A.C. voltage such as the one shown at 58 is ideally developed across leads 24 and 26 which averages 1.414 times the R.M.S. voltage developed between secondary leads 18 and 20.

In a practical circuit, however, it is impossible to find perfect transformers, rectifiers, or capacitors. In FIG. 5 a table listing the A.C. and D.C. voltage components of the voltage developed between leads 24 and 26 for various values of capacitor 14 is shown. The average power dissipated by the C.R.T. heater filament for each capacitor value is also shown. It may be noted that the voltage developed between leads 24 and 26, and consequently the power dissipation of the heater filament, increases with an increase in capacitance of capacitor 14 up to a value of approximately 2,200 microfarads.

Referring now to FIGS. 6 and 7, two alternate embodiments for the circuit of the device are illustrated. In FIG. 6, a series connection of a switch 60 and a capacitor 62 is coupled in parallel with capacitor 14. By closing or opening switch 60, the voltage developed between the leads of heater filament 22 is varied to provide a selective control of the picture tube brightness. In FIG. 7, a variable capacitor 64 is coupled in parallel with capacitor 14 to similarly vary the voltage developed across the leads of heater filament 22 to provide selective brightness control.

Empirically, it has been found that by varying the capacitance of the circuit between 500 and 1,000 microfarads by either of the methods suggested in FIGS. 6 and 7, good brightness control is available for most all black and white and color television sets.

It is contemplated that certain modifications and permutations of the present invention will become apparent to those skilled in the art upon a reading of the preceding description and after having studied the drawing. For instance, the present invention is suitable for multiplying the voltage supplied to the heater filament of any type of electron emission tube, such as radio tubes. Similarly, there are many ways to couple the circuit of the present invention into existing C.R.T. circuits, where the embodiments shown in FIG. 2 and FIG. 3 illustrate but two ways.

It is therefore intended that the following appended claims be interpreted as including all such modifications and permutations as fall within the true spirit and scope of the present invention.

I claim:

1. A voltage multiplier device for developing a voltage across the two leads of an electron emission tube heater filament that is greater than the voltage developed across two secondary leads of a heater filament transformer, the device comprising first capacitor means having a first plate coupled to a first one of said secondary leads, and
   rectifier means coupling both a second one of said secondary leads and a first one of said heater filament leads to both a second plate of said first capacitor and a second one of said heater leads.

2. The device recited in claim 1 wherein
   the voltage developed across said heater filament leads is up to 1.414 times the voltage developed across said secondary leads.

3. The device recited in claim 2 wherein
   said rectifier means is a solid state diode, and
   said first capacitor means is a first capacitor.

4. The device recited in claim 3 wherein
   said first capacitor has a value of between 1,000 and 3,000 microfarads.

5. The device recited in claim 1 further comprising
   a second capacitor means coupled in parallel with said first capacitor means.

6. The device recited in claim 5 wherein said second capacitor means includes the series connection of
   a second capacitor, and
   an on-off switch means,
   whereby said switch means when on couples said first and second capacitors in parallel.

7. The device reicted in claim 5 wherein said second capacitor means includes
a variable capacitor.
8. The device recited in claim 1 further comprising
a non-conducting circuit support means,
first insulation piercing terminal post means attached to said support means for coupling said second secondary lead to one of the leads of said rectifier and to said first heater filament lead,
a second insulation piercing terminal post means attached to said support means for coupling said plate to said first secondary lead, and
a third insulation piercing terminal post means attached to said support means for coupling the other lead of said rectifier to said second plate and to said heater lead.
9. The apparatus recited in claim 1 further comprising
a wire harness assembly having a male connector for coupling with a female connector of an existing television picture tube wire harness and having a female connector for coupling with the pin end of a television picture tube, and
means coupling said rectifier means and said capacitor means to said wire harness assembly.
10. A method for developing a voltage across the two leads of an electron emission tube heater filament that is greater than the voltage developed across the two secondary leads of a heater filament transformer comprising the steps of:
coupling the series connection of a rectifier means and a capacitive means across the secondary leads of said filament transformer, and
coupling the leads of said electron emission tube heater filament in parallel with said rectifier means.
11. A method as claimed in claim 10 further comprising the step of coupling a second capacitive means in parallel with said first capacitive means.

* * * * *